United States Patent

[11] 3,568,842

| [72] | Inventor | John W. Bozek<br>6093 Waterfront Drive, Waterford, Mich.<br>48095 |
|---|---|---|
| [21] | Appl. No. | 806,205 |
| [22] | Filed | Mar. 11, 1969 |
| [45] | Patented | Mar. 9, 1971 |

[54] APPARATUS FOR SEPARATING MIXTURES OF IMMISCIBLE LIQUIDS
6 Claims, 8 Drawing Figs.

[52] U.S. Cl. .................................................. 210/307,
210/312, 210/315, 210/488, 210/521, 210/532
[51] Int. Cl. ................................................... B01d 29/42,
B01d 25/00
[50] Field of Search........................................... 210/(C.D.
Digest), 23, 73, 84, 299, 307, 311, 315, 488, 498,
502, 312, 313, 532, 533, 521, 535

[56] References Cited
UNITED STATES PATENTS

| 349,990 | 9/1886 | Gaillet et al. ................ | 210/521 |
| 1,176,774 | 3/1916 | Morris........................ | 210/521X |
| 1,274,814 | 8/1918 | Sundness et al. ............. | 210/521X |
| 2,919,030 | 12/1959 | Grant et al..................... | 210/488 |
| 3,223,240 | 12/1965 | Muller......................... | 210/488X |

FOREIGN PATENTS

| 498,313 | 10/1919 | France ........................ | 210/521 |
| 645,710 | 11/1950 | Great Britain................ | 210/521 |
| 813,574 | 5/1959 | Great Britain................ | 210/23 |

*Primary Examiner*—Frank A. Spear, Jr.
*Attorney*—James P. Meloche

ABSTRACT: A separator element construction; for use in the continuous separation of mixtures of immiscible liquids when the mixture flows through the element such as for separation of water from turbine engine fuel, wherein a plurality of ring members are stacked to form a hollow chamber with shaped slots communicating from the interior to the exterior of the chamber and wherein, the upper surface of each slot is oleophilic and the lower surface of each slot is hydrophilic and is connected to a hydrophilic drain surface to permit the water that collects on the hydrophilic surface to drain to a sump without interferring with the expelled water-free fuel when the mixture is forced through the slots.

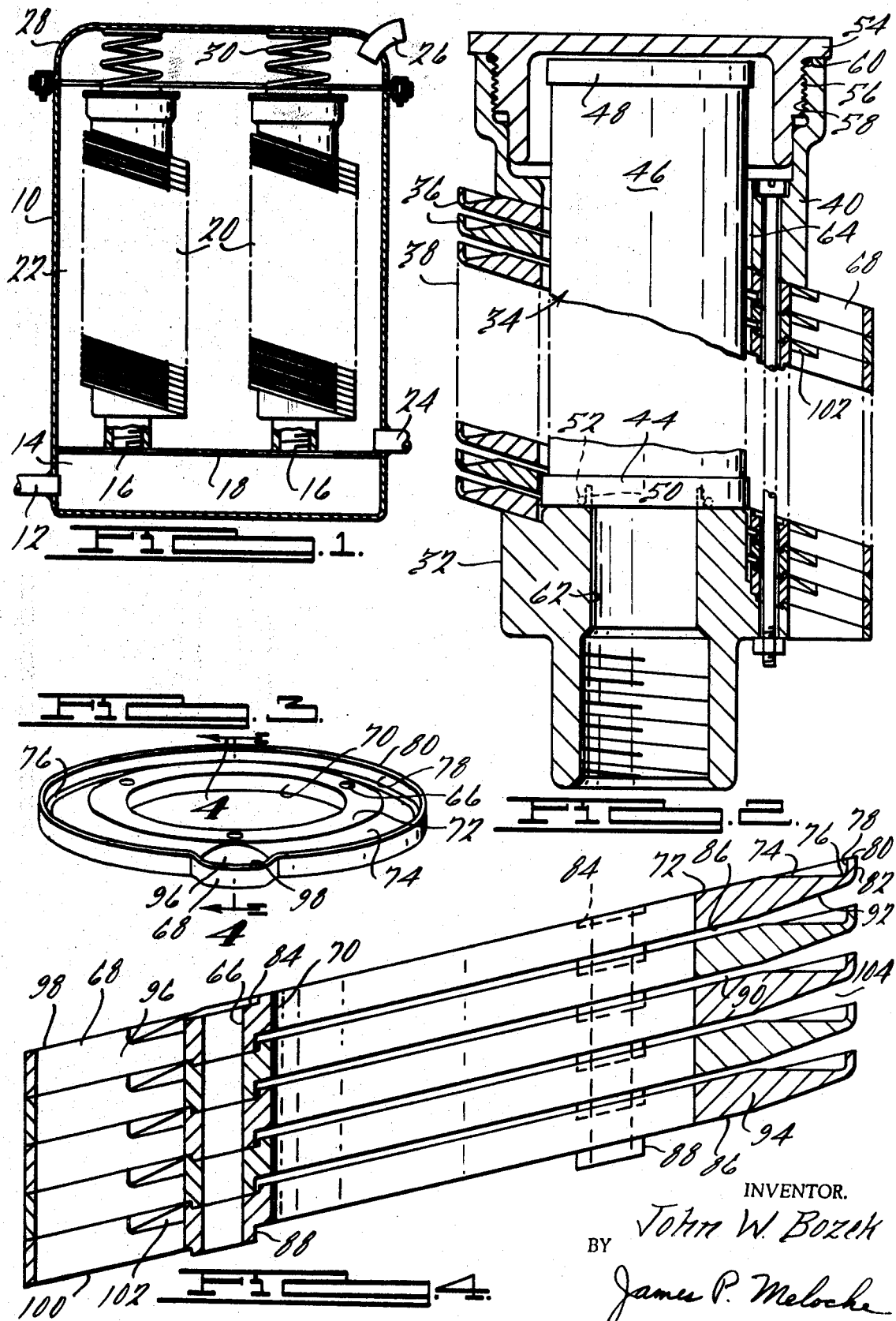

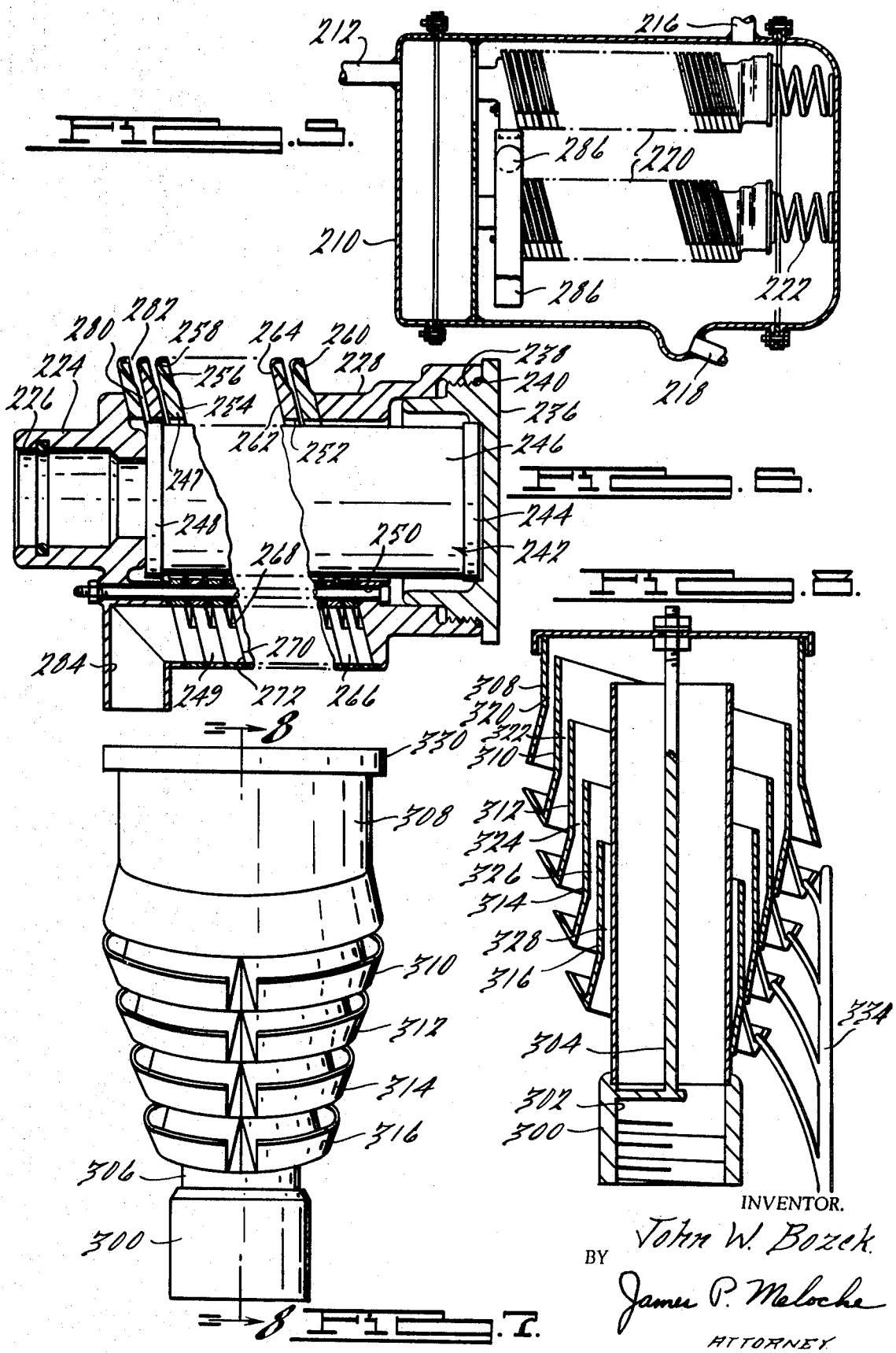

3,568,842

1

APPARATUS FOR SEPARATING MIXTURES OF IMMISCIBLE LIQUIDS

BACKGROUND OF THE INVENTION

My invention relates to the field of devices that coalesce and separate the dispersed phase of a binary immiscible dispersion or emulsion from the continuous phase, including the devices that hydrocarbon turbine fuels are pumped through to continuously coalesce and separate any contaminating water that may be present in the fuel, and more particularly inserted, as for example, into the coalescer-separator tanks such as shown in U.S. Pat. 2,953,249.

Heretofore, such devices relied on the gravity induced counter and cross current flow of the two phases to effect separation after the coalesing was completed. Typically, the emulsion is forced into one side of a fiber pack wherein the water particles combine to form large drops and the fuel and the large water drops emerge on the opposite side of the fiber pack to separate by gravity. Some of the large water globules may free themselves from the pack whereupon they become freely falling bodies in the fuel subject to being carried away by the fuel when flow rates are high, while other globules may run down the face of the fiber pack thereby forming a curtain of water that must be penetrated by the fuel. This uncontrolled movement of the coalesced water globules makes the capacity and efficiency depend on the size of the drops; imposes critical performance requirements on a coalescing and separating media; and leads to operating conditions which result in erratic results or complete breakdown.

BRIEF SUMMARY OF THE INVENTION

My invention provides a new and novel method and apparatus for eliminating the formation of free falling globules of water and for eliminating the formation of a curtain of water globules or water films that interfere with the water-free fuel trying to flow out of the coalescer-separator unit.

In the separating means described in my invention the undesirable movement of individual drops is eliminated by: collecting the enlarged drops of the dispersed phase liquid as they emerge from the coalescing medium; providing a means for the further coalescence of the collected drops into continuous films or streams; and providing a means for the moving of the separated volumes of coalesced liquid to the common storage point such as the bottom of the coalescer separator tank without interference from the continuous phase liquid. The collection of the individual drops of the dispersed phase liquid is accomplished by passing the mixture of the two immiscible liquids between two surfaces which have a relatively large area and are positioned quite close to each other. The drops of the dispersed liquid collect preferentially on one of the two surfaces as a result of the density difference between the liquids and as a result of the difference in the affinities of the liquids for the material comprising the flow passageway. Coalescence of the collected drops into cintinuous films is brought about by using the collecting surfaces to guide the drops to intermediate accumulating depositories; the individual drops colliding and coalescing as they move along the guiding surface.

The intermediate accululations of dispersed phase liquid are then moved to a common sump in the separator tank by means of continuous guiding surfaces which lead from the intermediate accumulation points to the tank sump. The moving accumulated dispersed phase liquid is in contact with a retaining surface and is shielded from any interference by the motion of the ontinuous phase liquid at all times. While the dispersed phase liquid is present in the form of isolated drops suspended in the continuous phase, all motion is in essentially the same direction. The movement of the continuous phase liquid actually promotes the coalescence and deposition of the dispersed liquid on the collecting surfaces. Once the drops have been collected, the retaining, guiding, and shielding surfaces prevent the movement of the continuous phase liquid from interferring with the movement of the collected dispersed phase liquid.

2

With the foregoing brief summary in view, together with such other objects and advantages as may subsequently appear, the invention resides in the parts and in the combination; construction and arrangements of parts hereinafter described and claimed, and illustrated by way of example in the accompanying drawing, in which:

FIG. 1 is a vertical partially cut away view of a vertical coalescer-separator tank showing two coalescer-separator units installed in the tank.

FIG. 2 is a vertical sectional view of a coalescer-separator unit for insertion in a coalescer-separator tank in the vertical position in FIG. 1.

FIG. 3 is a single plate from the stack in FIG. 2 as viewed from the right side of FIG. 1.

FIG. 4 is a plurality of sectional view A—A of FIG. 3 stacked one upon the other.

FIG. 5 is a vertical partially cutaway view of a horizontal coalescer-separator tank showing two coalescer-separator units installed in the tank.

FIG. 6 is a vertical sectional view of a coalescer-separator unit for insertion into a coalescer-separator tank in the horizontal position in FIG. 5.

FIG. 7 is an elevation view of another form of the coalescer-separator unit of my invention for insertion into a coalescer-separator tank.

FIG. 8 is a vertical section B—B of FIG. 7.

FIGS. 1, 2, 3, and 4 show one form of the invention for vertical operation.

Tank, 10, is a filter and water separator tank of the commonly available commercial type, having an inlet, 12, where the fluid to be treated is pumped into chamber, 14, thence into ports, 16, in divider wall, 18, to the inside of the coalescer-separator units, 20, mounted on the ports, 16. The fluids pass out of the units, 20, into the chamber, 22, where the heavier constituent, for example water, collects on top of plate, 18, and is removed through outlet, 24, while the lighter consitiuent, for example jet fuel, is removed through outlet, 26. Tank, 10, has a removable top, 28, which may carry compression springs, 30, to hold units, 20, in place on plate, 18, when closed and to permit units, 20, to be serviced when open.

The coalescer-separator unit assembly, 20, as shown in FIG. 2 is provided with a base, 32, surmounted by a filter, 34, and a plurality of stacked plates, 36, forming stack, 38. Plates 36, are themselves surmounted by top, 40. A plurality, for example three, of nutted bolts, 42, pass through top, 40, and the plates, 36, and the base, 32, to rigidly clamp stacked plates, 36, between top, 40, and base, 32. Filter, 34, is of the common hollow cylinder type provided with a filter base, 44, a filter body, 46, and a filter, top, 48. Filter base, 44, is connected in a suitable fluid tight manner to base, 32, as by a suitable hole in filter base, 44, penetrated by cylindrical boss, 50, on base, 32, and sealed by O-ring, 52. Cap, 54, is secured to top, 40, by threads, 56, 58 in a fluid tight engagement by O-ring, 60, and holds down filter, 34, on base, 32. Base, 32, is provided with a bore, 62, that communicates with the inside of filter, 34, so that when fluid to be treated is faced into the bottom of bore, 62, it passes up into filter, 34, then through filter body, 46, into chamber, 64, then through the stack, 38, of plates, 36, to chamber, 22.

FIGS. 3 and 4 show the details of plates, 36, which embodies one form of my new and novel coalescer construction.

FIG. 3 is an oblique view of a single plate, 36, showing its generally circular relieved plate shape of uniform cross section except for three bores, 66, provided for bolts, 42, and except for main conduit, 68. Referring to FIG. 4, it will be understood that each plate, 36, has an inner face, 70; a top face, 72; a top diverging face, 74; a channel face, 76; a rim inner face, 78; a rim top face, 80; a rim outer face, 82; three bolt holes, 66; three counter sinks, 84; a bottom face, 86; three bosses, 88, adapted to fit into counter sinks, 84, on adjacent plates to provide slot, 90, formed by faces, 86, and 72, on adjacent stacked plates; and a bottom diverging face, 92. The cross section, 94, is essentially uniform around plate, 36, in both directions to the opposite side of the plate, 36, as viewed in FIG. 4, where main conduit 68, is located. Conduit, 68, has an inner face, 96; a top face, 98; a bottom face, 100, which butts with the top face, 98, of the adjacent plate. When the plates are stacked, face, 96, forms a continuous conduit, 68, with two openings, 102, formed by faces, 74, 76, and 78, intercepting face, 96. Faces 72, 74, 76, 78, and 96, are hydrophilic surfaces and faces 86, 92, and 82 are oleophilic surfaces.

The operation of the device of FIGS. 1, 2, 3, and 4 will now be described for treating an emulsion of water in turbine engine fuel. The emulsion is pumped into inlet, 12, and passes through divider plate, 18, only into bore. 62, to the inside of filter body, 46. Filter body, 46, removes dirt and coalesces microscopic water droplets into larger drops having a diameter approximately the height of slot, 90, as the emulsion passes from the inside of filter body, 46, through the filter to the slots, 90, where the water collects as a film on surfaces 72, 74, 76, and 78, and water free fuel passes through opening, 104, to the outside of stack, 38. The water film flows by gravity to opening, 102, and down conduit, 68, on the faces, 96, to the bottom of tank, 10, where it may be removed through outlet, 24, the water free fuel is removed through top outlet, 26.

It is understood that the selection of the filter body, 46, and the height of slots, 90, are both dependent on the type of emulsion being treated. If the height of slot, 90, approximates the size of the emulsion droplets entering inlet, 12, then filter body, 46, will not be needed unless the emulsion is contaminated with other particals making a prefilter desirable. If the emulsion is very tight the filter body, 46, must be selected to enlarge the droplets sufficiently to contact the face, 72, of slot, 90, as the droplets pass through slot, 90. The radial dimension of faces, 72, and 86, may also be varied to provide for all water droplets to come into contact with face, 72, depending on the type of emulsion being treated.

FIGS. 5 and 6 illustrate a horizontal version of the same type coalescer-separator as shown in FIG. 1. In FIG. 5, a tank, 10, is provided with an emulsion inlet, 212, a divider plate, 214, a top outlet, 216, and a bottom outlet, 218. Two coalescer-separator units, 220, are shown clampingly mounted horizontally within tank, 210, between divider plate, 214, and compression spring, 222. FIG. 6 shows the details of unit, 230.

A base, 224, is provided with a bore, 226, which engages the inlet nipples of the commonly available filter-coalescer tanks, 210. Base, 224, and top, 228, clampingly engage a stack, 230, of plates, 232, by means of nutted bolts, 234, passing through said top, 228, said stack, 230, and said base, 224. Cap, 236, is secured to top, 228, as by threads, 238 and forms a sealed end by means of O-ring, 240. Cap, 236, also holds filter, 242, against base, 224. Filter, 242, is a hollow cylindrical body having a closed top, 244, a filter body, 246, and a base, 248, which is provided with a part, not shown, that connects the interior of filter 242, with bore, 226, in any suitable fluid tight manner.

Plates 232 form a horizontal stack, 230, and for purposes of description, the side of the plates facing base, 224, shall be termed the bottom. Plates 232, are generally relieved circular shaped objects of constant cross section, 247, except in the area of channel, 249, and bolt holes, 250. Similar to the plate shown in FIG. 3, the plates, 232, have an inner bore face, 252; a top face, 254; a diverging (conical surface) top face, 256; a channel face, 258; a rim inner face, 260; a bottom face, 262; a diverging bottom face, 264; and, for example, three bolt holes, 250. The ring formed by wall, 266, at the lowest point on plate, 232, is intercepted by surfaces, 156, 158, 160, to form ports, 268. The top channel surface, 270, of each wall, 266, butts with the bottom channel surface, 272, on the adjacent plate forming a conduit, 249, with a pair of ports, 268, open to each plate, 232. Suitable means, such as shims or bosses at bolt holes, 250, are provided to maintain a fixes separation between surfaces, 254, and 262, on adjacent plates thereby forming slots, 280, leading from the inside to the outside of stack, 230. Surfaces 254, 256, 260, and 266, are of a material that is preferentially wetted by the dispersed phase and surfaces, 160, and 166, are of a material that is preferentially wetted by the continuous phase.

The operation of the device of FIGS. 5 and 6 is as follows: The emulsion to be treated enters inlet, 212, and flows into bore, 226, to the inside of filter, 242, thence through filter body, 246, to slots 280. Filter body, 246, removes dirt and coalesces the minute droplets of the dispersed phase to a drop size approximating the height of slot, 280. The dispersed phase continuously collects as a film on surfaces 254, 256, 258, and flows by gravity to ports, 268, and along conduit, 248, to outlet, 284. Outlet, 284, and an extension tube, 286, having inner surfaces of a material that is preferentially wetted by the dispersed phase direct this phase to the bottom of the tank, 210, without interference with the continuous phase.

FIGS. 7 and 8 illustrate another constrction for formation of a slotted unit using the principles of my invention. These FIGS. only show the alternate construction of the stacked plate part of the unit because the inner filter, not shown, and the tank, not shown, would operate in the same manner as for the species illustrated in FIGS. 1 to 6. This construction is intended for vertical operation and comprises a series of telescoped tubes having a tilted trough at the lower end of each tube.

Base, 300, is cored at, 302, and supports rod, 304, and inner cylinder, 306. Tubularelements, 308, 310, 312, and 314, and 316, and 306, are coaxial and are uniformly radially spaced apart and held rigidly in the positions illustrated by suitable fastening means such as, for example, standoff bolts, not shown, joining each tube to its neighbor and said elements thereby define uniform cylindrical shaped slots, 320, 322, 324, 326, and 328. A top, 330, seals the top end of element, 308, and is held in place by nut, 332, on rod, 304. Tubular elements 308, 310, 312, 314, 316, and 306, are formed with the whole outside wall, which includes the inside of the troughs, of a material that is hydrophilic; and the whole inside wall, including the outside of the troughs, of a material which is hydrophobic or oleophilic. In treating a dispersion of water in jet fuel the dispersion enters the device through bore, 302, and flows to slots, 320, 322, 324, 326, 328, where the water clings to the outside of the tubular elements and flows by gravity into the troughs and from thence by a suitable hydrophilic conducting surface, as for example a glass rod, 334, in FIG. 8, the bottom of the tank.

While the construction of FIGS. 7 and 8 is shown as coaxial tubes it is understood that modified eliptical shaped tubes could be provided with a common line of contact common with the low point in the troughs.

The material chosen for the wall surfaces will depend on the wetting properties of the two fluids comprising the immiscible mixture. Where water is to be separated from hydrocarbon fuel a hydrophilic material such as nylon or glass for example, may be used for collecting and conducting the water phase; and materials such as a polyolefin polymer, or a silicone polymer, or a material such as Teflon may be used where hydrophobic surfaces are required. The plate, 36, in FIG. 3, may, for example, be molded from a nylon resin and the indicated surfaces rendered hydrophobic by coating or laminating with a hydrophobic material.

I claim:

1. Apparatus for separating and collecting the dispersed phases of a dispersion of immiscible fluids, comprising:
   a base;
   a first surface, secured to said base, for attracting the continuous phase of the dispersion preferentially to the discontinuous phase;
   a second surface, secured to said base, and spaced close to said first surface to form a slot, for attracting the discontinuous phases of the dispersion preferentially to the continuous phase;
   said slot comprising parallel walls adjacent diverging walls;
   an extension on said second surface that conducts said discontinuous phase away from the slot; and means to direct said dispersion through said slot.

2. Apparatus, for use in an emulsion coalescer and separator tank wherein binary immiscible fluids are continuously separated and removed by collecting and removing the heavy phase from the bottom of the tank and by collecting and removing the light phase from the top of the tank; comprising:
   a vessel having an interior chamber;
   an inlet port on said vessel to permit the flow of said emulsion to said interior chamber;
   a plurality of first and second walls defining slots in said vessel, said slots communicating from said interior chamber to the outside of said vessel by parallel walls followed by diverging walls;
   said first walls being constructed from a material having different wetting properties than said second wall, whereby one phase of the emulsion will preferentially wet one wall; and
   conductors, connecting with each wall preferentially wetted by said heavy phase and having the same wetting characteristics as the wall, for draining said heavy phase to the bottom of the tank.

3. Apparatus, as set forth in claim 2, and further including a filter, secured to said inlet port, for filtering and precoalescing said emulsion before it enters said slots.

4. Apparatus, as set forth in claim 2, wherein a plurality of individual segments are rigidly spaced to form said plurality of first and second walls.

5. Apparatus, as set forth in claim 4, wherein said segments are flat plates provided with a top surface of a material preferentially wetted by the denser phase.

6. Apparatus, as set forth in claim 4, wherein said segments are telescoped cylindrical shaped bodies having an outer surface preferentially wetted by the denser phase.